US005992685A

United States Patent [19]

Credle, Jr.

[11] Patent Number: 5,992,685

[45] Date of Patent: Nov. 30, 1999

[54] FOUNTAIN DISPENSING MODULE

[75] Inventor: William S. Credle, Jr., Stone Mountain, Ga.

[73] Assignee: The Coca-Cola Company, Atlanta, Ga.

[21] Appl. No.: 09/012,835

[22] Filed: Jan. 23, 1998

[51] Int. Cl.[6] .................................................... G01F 11/00

[52] U.S. Cl. .................................. 222/1; 222/80; 222/95; 222/105; 222/129.1; 222/145.5; 222/146.6; 222/325; 222/494

[58] Field of Search .................................... 222/1, 80, 95, 222/96, 105, 129.1, 145.5, 146.6, 325, 494

[56] References Cited

U.S. PATENT DOCUMENTS 3,249,268 5/1966 Neuner .................................... 222/494
5,433,348 7/1995 Deering et al. ...................... 222/129.1
5,797,519 8/1998 Schroeder et al. ................... 222/129.1

FOREIGN PATENT DOCUMENTS 2048827 12/1980 United Kingdom ................... 222/494
2146620 4/1985 United Kingdom ................ 222/129.1

*Primary Examiner*—Joseph A. Kaufman
*Attorney, Agent, or Firm*—Dennis W. Braswell

[57] ABSTRACT

A dispense module for both carbonated and non-carbonated beverages is connected to a postmix beverage dispenser in the same space that any well-known dispensing valve occupies. The module includes a housing having a front-loading, refrigerated chamber for receiving a disposable concentrate package, a motor and pump drive, a refrigeration system, a front door, a water on-off valve, a water flow control, and a control system. The disposable concentrate package includes an integral concentrate container and pump, mixer and nozzle unit. The dispense module can be an integral part of a new dispenser and can also be retrofitted onto existing dispensers in place of one or more dispensing valves to dispense either carbonated or non-carbonated beverages. The concentrate packages are easily and quickly inserted into and removed from the module to change flavors as desired.

33 Claims, 9 Drawing Sheets

FOUNTAIN DISPENSING MODULE

BACKGROUND OF THE INVENTION

1. Field of the Invention

This invention relates to postmix beverage dispensing and in particular to a unique dispensing module that can be original equipment or retrofitted onto existing beverage dispensers in place of a dispensing valve. A disposable concentrate package with integral pump, mixer and nozzle is front-loaded into the module which refrigerates the concentrate, pumps it into a mixer and dispenses the beverage.

2. Description of the Prior Art

Postmix beverage dispensers are well-known and include counter-electric units with mechanical refrigeration systems and towers with ice-cooled drop-in or cold plate units under the counter or remote. These dispensers include carbonators (built-in or separate) for providing carbonated or soda water for carbonated beverages and some also provide still water for non-carbonated beverages. The dispensers usually include a plurality of dispensing valves on the front for dispensing a variety of different beverages. Soft drink concentrates or syrups are often supplied in bag-in-box or figal containers that are separate from the dispenser, and juice concentrates, which require refrigeration, are supplied in a variety of packages that fit into the dispenser itself to provide the needed refrigeration. Juice dispensers are known with built-in pumps, such as peristaltic pumps, built into the dispenser which work with a tube that is part of a disposable juice package. Juice concentrate packages are also known in which include an integral pump and mixing nozzle disposable along with the concentrate container, to eliminate the need to sterilize any equipment. The pump connects to a motor in the dispenser.

Because of the different needs of equipment to dispense non-carbonated juice beverages and carbonated soft drink beverages, different types of dispensing equipment are used. That is, a restaurant often has a soft drink dispenser alongside a juice dispenser.

SUMMARY OF THE INVENTION

The dispensing module of this invention provides great flexibility and many advantages over known dispensing equipment. The dispensing module includes a housing with a front door enclosing a front-loading concentrate package chamber, a refrigeration system, a motor, a pump drive, a water valve, a water flow control and a control system. This invention also includes the disposable concentrate package itself with integral pump, mixer and nozzle.

The dispensing module is a small, self-contained, postmix dispenser that only needs cold water (still or soda) and electricity to dispense a beverage. A standard postmix valve can be easily removed and replaced with this dispensing module. This invention provides the following advantages:

(1) conversion of a soft drink valve to a juice valve, and vice versa;

(2) conversion of a soft drink dispenser to also be a juice dispenser;

(3) provides a convenient, easy to use, front loading, juice dispenser;

(4) allows an operator to quickly and easily change beverages, such as from orange juice to lemonade or tea;

(5) conversion of low volume beverages to smaller size supply containers to avoid problems of "out-of-date" concentrate;

(6) provides equipment convenient for high ratio dispensing;

(7) provides a front-load juice dispenser;

(8) all options are field retro-fittable;

(9) allows reduction of dispenser inventory;

(10) makes dispenser servicing easier;

(11) makes it possible to change beverages without sanitizing the dispenser; and

(12) eliminates nozzle sanitation altogether.

It is an object of this invention to provide a dispensing module.

It is another object of this invention to provide a method of retrofitting a soft drink dispenser to also be a juice dispenser.

It is another object of this invention to provide a combination soft drink and juice dispenser.

It is another object of this invention to provide an improved disposable concentrate package with an integral pump, mixing chamber and nozzle.

It is another object of this invention to provide an improved concentrate pump and mixer.

It is another object of this invention to provide an improved annular outlet port check valve.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENT

Figure 1:
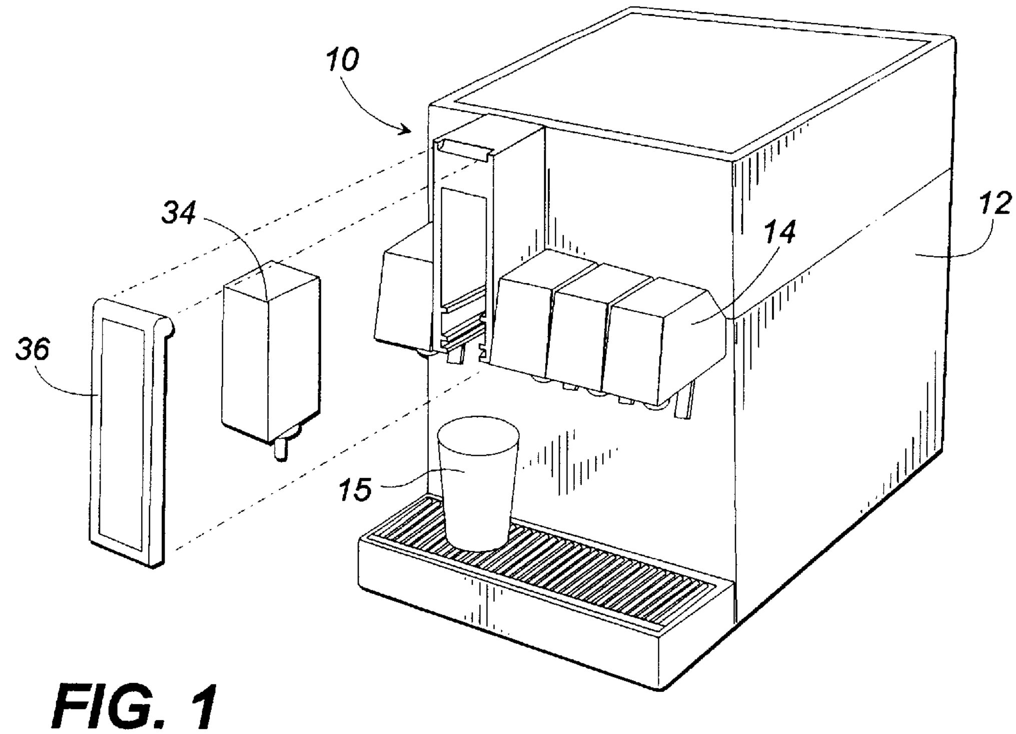
FIG. 1 is a perspective, partially exploded view, of a postmix beverage dispenser having the dispensing module of this invention substituted for one of the well-known dispensing valves or faucets.

With reference now to the drawings, FIG. 1 shows the preferred dispense module 10 of the present invention installed on a counter-electric, postmix, soft drink dispenser 12 in place of one of the dispensing valves 14, for dispensing a beverage into a cup 15.

Figure 2:
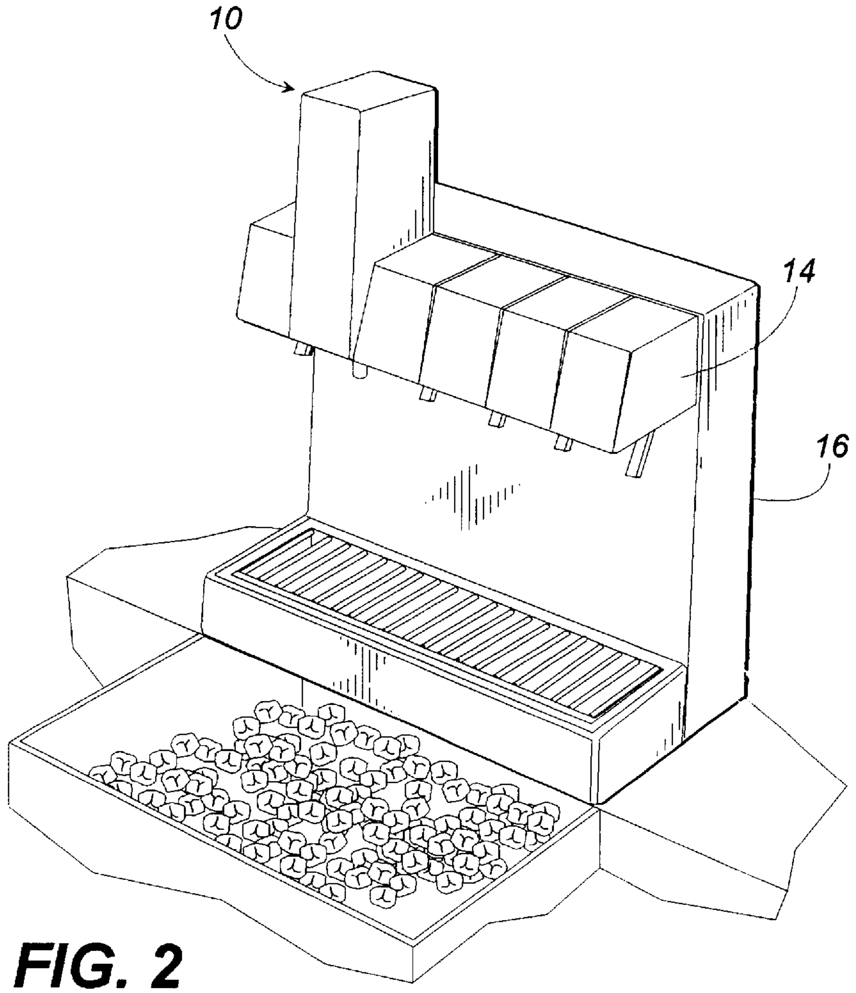
FIG. 2 is a perspective view of a beverage dispensing tower having the dispensing module of this invention substituted for one of the dispensing valves.

FIG. 2 shows a tower type of dispenser 16 with the dispense module 10 installed thereon in place of one of the valves 14.

Figure 3:
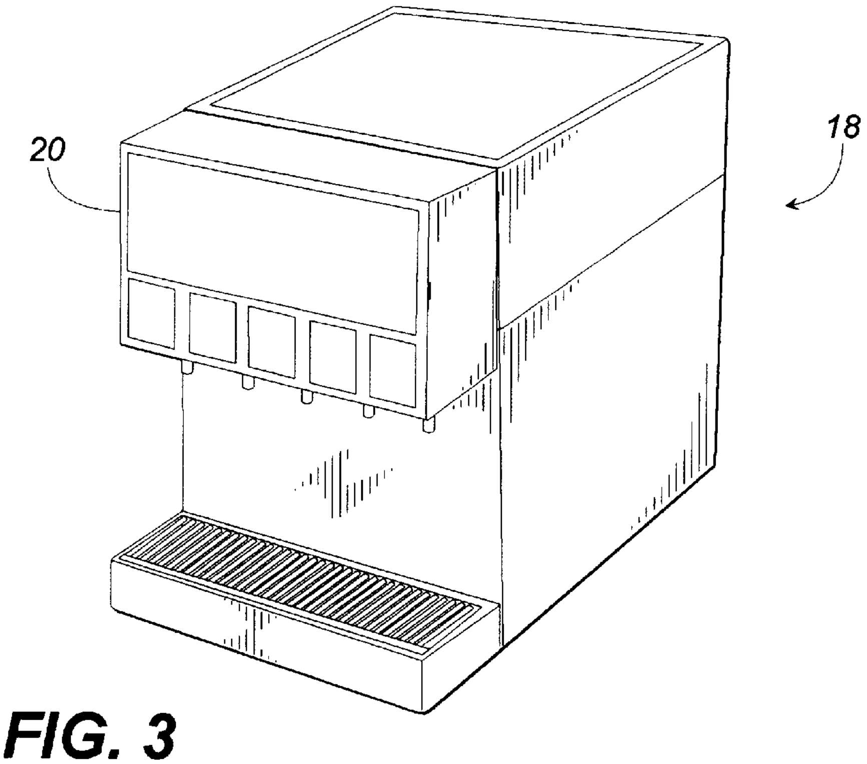
FIG. 3 is a perspective view of a beverage dispenser having a dispensing module of this invention substituted for each of the dispensing valves, and having a full cover placed over the modules.

FIG. 3 shows a juice dispenser 18 with five modules 10 installed thereon and no valves 14 and with a cover 20 over the modules.

Figure 4:
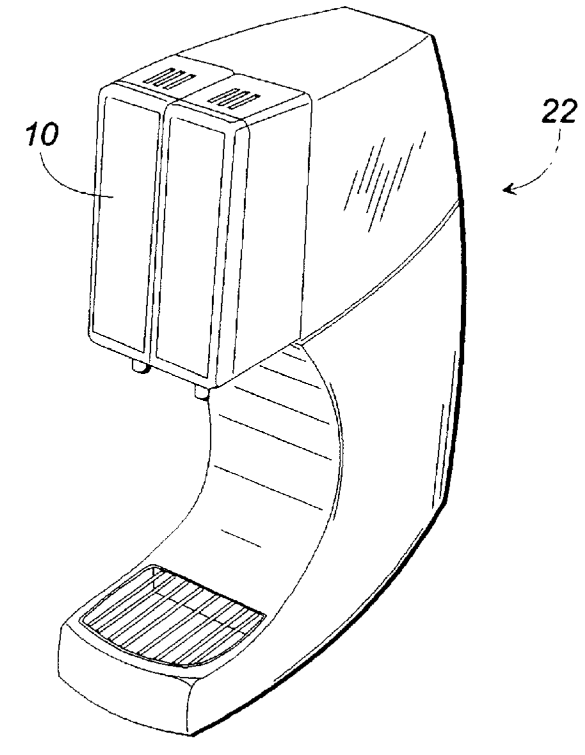
FIG. 4 is a perspective view of a new, compact juice dispensing tower using two modules of this invention.

FIG. 4 shows a tower 22 specifically designed for use with two dispense modules 10.

Figure 5:
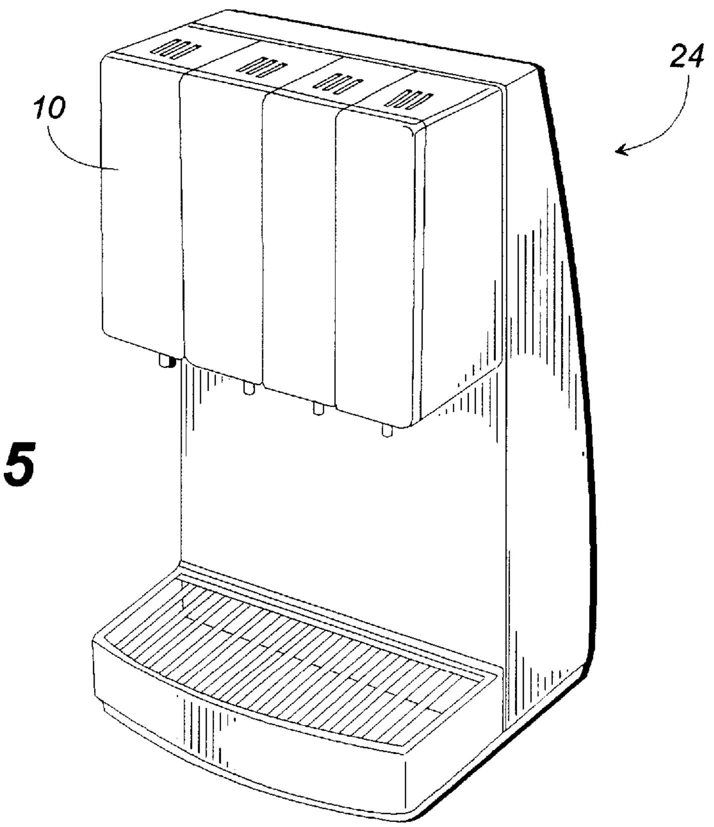
FIG. 5 is a perspective view of a new, compact juice dispensing tower using four modules of this invention.

FIG. 5 shows a tower 24 for use with four dispense modules 10.

Figure 6:
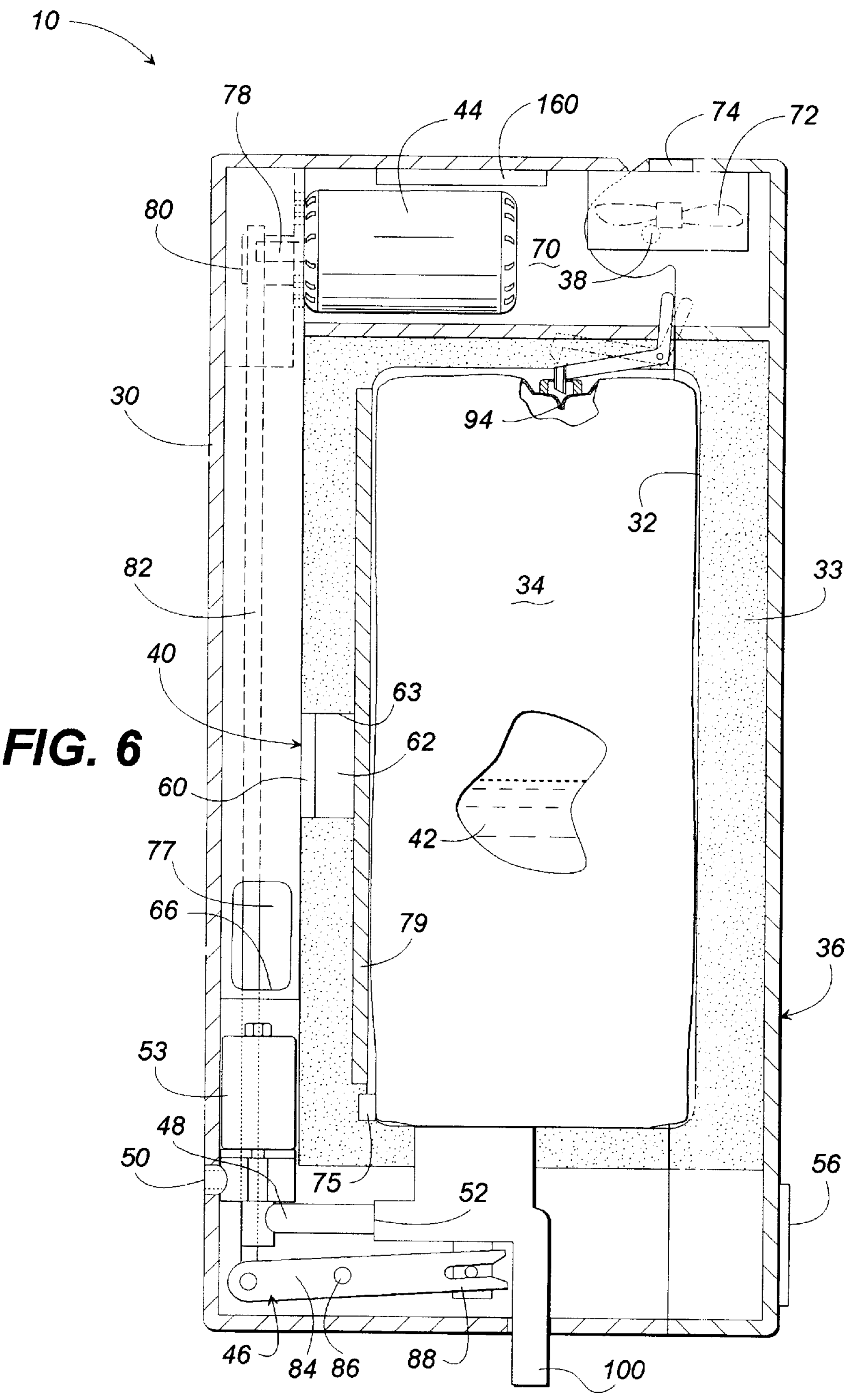
FIG. 6 is a cross-sectional side view through the dispensing module of the present invention.
Figure 7:
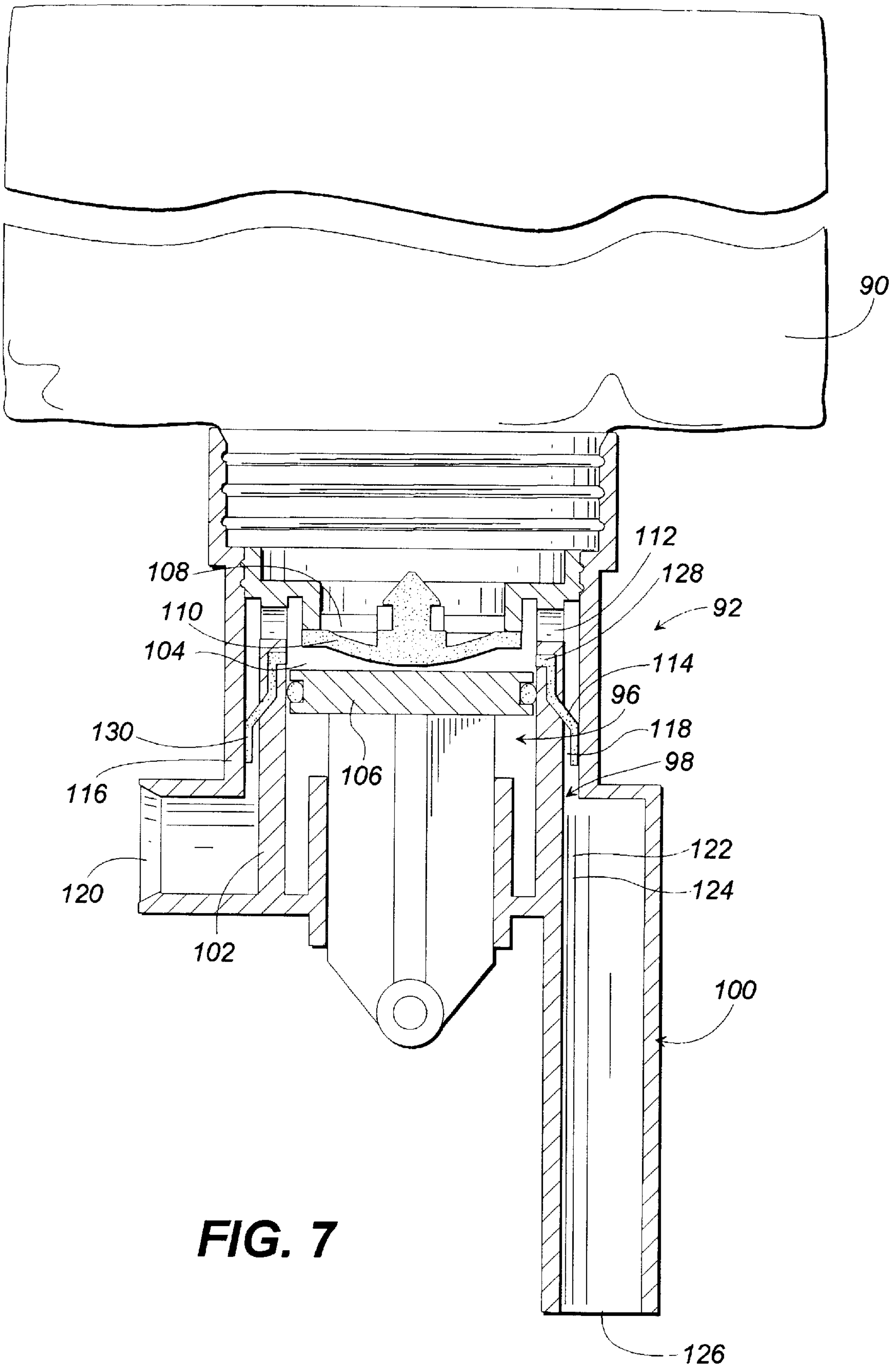
FIG. 7 is a cross-sectional side view through the pump, mixer and nozzle unit of the concentrate package of the present invention.
Figure 11:
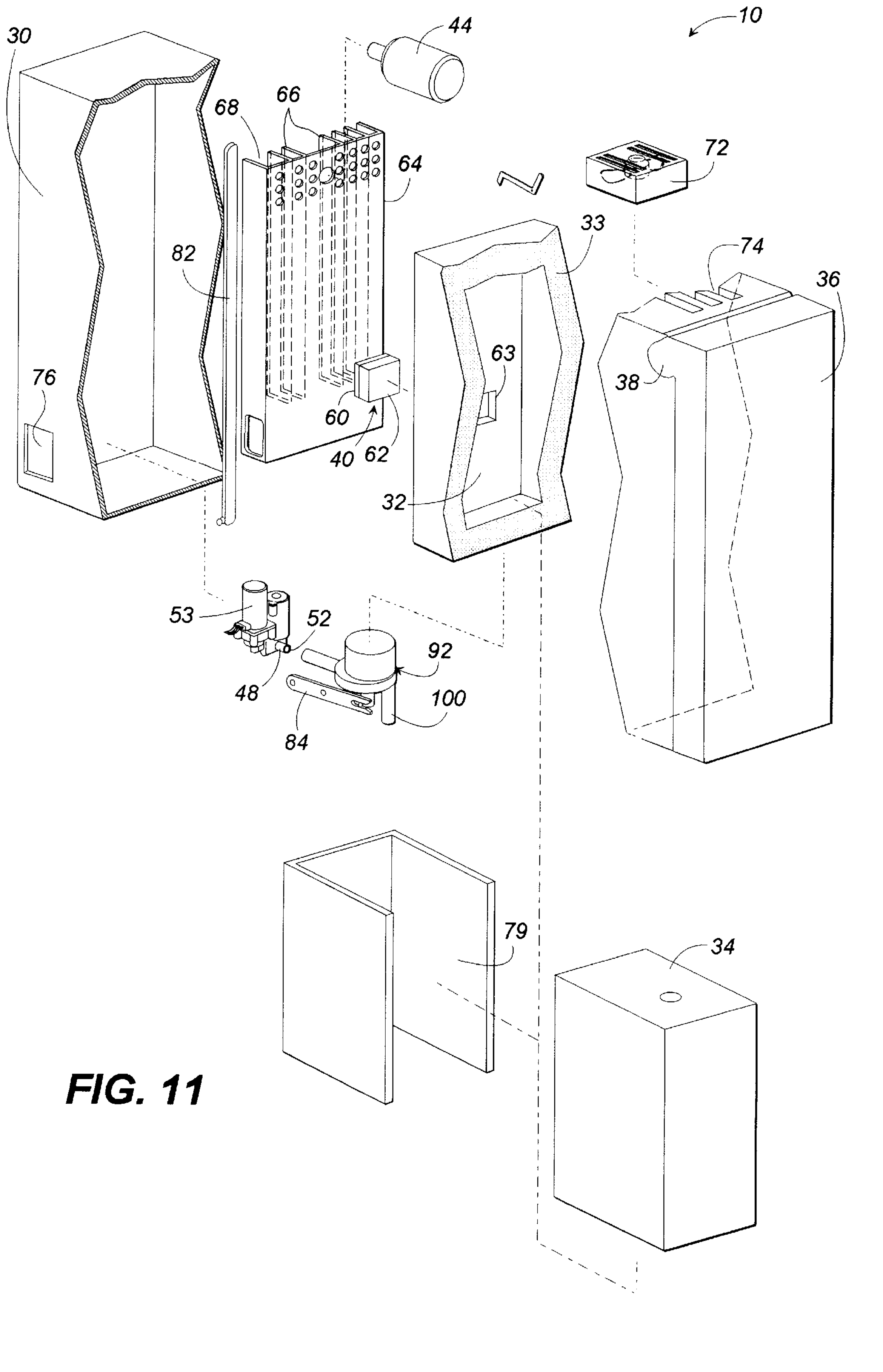
FIG. 11 is an exploded, perspective view of the module.

FIGS. 6, 7 and 11 show the dispense module 10 which includes a housing 30 enclosing a chamber 32 for a disposable concentrate package 34. A layer 33 of insulation surrounds the chamber. The housing has a front door 36 hinged at its top at 38 for providing access to the chamber. The module 10 also includes a refrigeration system 40 for cooling the concentrate 42 in the package, a motor 44, a pump drive 46 connected to the motor, a water conduit 48 including an inlet port 50 and an outlet port 52, a water valve 53, a flow control 54, beverage dispense buttons 56, and a control system 58 for controlling the motor and the water valve.

The refrigeration system 40 is preferably a thermoelectric system including a thermoelectric chip 60 attached to the back of an aluminum block 62 and located in an opening 63 in the layer 33 of insulation. An aluminum radiator 64 is in contact with the hot side of the chip 60 and includes a plurality of fins 66 providing a plurality of vertical air passages 68. These passages 68 meet a horizontal passage 70 having a motor driven fan unit 72 adjacent an exhaust port 74. Air inlet openings 76 are provided in the housing and air inlet openings 77 are provided the outer fins. Cooling air flows in openings 76 and 77, through the passages 68 and 70 and out the exhaust port 74. A temperature sensor 75 provides input to the control system (described below).

The inside surface of the block 62 is in contact with a U-shaped aluminum casing 79 located inside the layer of insulation defining the chamber 32, for cooling the packages 34 and thus the concentrate 42.

The motor 44 is located in the top of the housing 30 and the pump drive 46 includes a drive shaft 78 connected to an eccentric 80 connected to a reciprocating rod 82, connected in turn to a lever arm 84 pivoted at 86 and having a pump drive coupling 88 on its distal end.

The concentrate package 34 includes a container 90 sealingly connected to an integral pump, mixer and nozzle unit 92. The container is preferably blow-molded and includes an air vent 94 in the top thereof.

The unit 92 includes a pump 96, a mixer 98, and an outlet nozzle 100. The pump 96 includes a pump housing 102 enclosing a pumping chamber 104 and including a reciprocable piston 106 slidably mounted thereon. The pump housing includes an inlet port 108 having an inlet check valve 110 and an outlet port 112 having an outlet check valve 114.

The mixer 98 includes a mixer housing 116 enclosing an annular, narrow, elongated, mixing chamber 118 surrounding the pump housing. The mixer housing includes a narrow, annular, inlet port 118, a water inlet port 120, and an outlet port 122. The outlet port from the pump is also the inlet port to the mixer. The thin, annular inlet port feeds a wide, narrow stream of concentrate into the mixing chamber for excellent mixing with the incoming water under pressure.

The dispensing nozzle has an inlet port 124 and a beverage dispensing outlet 126.

One aspect of the present invention is the annular outlet port check valve 114. This valve includes a central portion that is frusto-conical in shape and tapers from a smaller to a larger diameter in the direction of liquid flow, that is, away from the pumping chamber. The valve has a mounting portion 128 adjacent its proximal end and a cylindrical freely moving cylindrical portion 130 on its distal end. This shape for the valve allows the valve to open the outlet port easily on the exhaust stroke of the piston, but seals tightly on the intake stroke. This check valve provides the following advantages:

The basically cylindrical shape of the check valve results in a rigid structure that can have a high back pressure or cracking pressure if desired. The check valve can be made of a very soft material since the shape of the check valve provides the strength for high back pressure. When pumping high viscosity fluids with suspended particulate matter (pulp) it is important that the outlet check valve be soft enough to seal around the pump but have a relatively high back pressure to provide for quick check valve closing and hence accurate pumping. With other inexpensive check valves, such as umbrella check valves, it is difficult to achieve high cracking pressures with soft materials.

The shape of the annular check valve allows it to fit around the outside of the pumping chamber resulting in a more compact pumping assembly. For example, it is much more compact than a pump with two umbrella check valves that traditionally are laid out in an "in-line" fashion. This annular check valve also results in a pump that requires fewer parts than existing pump designs.

One additional advantage of the check valve is that it directs the concentrate flow in a thin-walled annular stream into the water that is flowing into the pump. This thin-walled annular flow promotes mixing with the water and reduces the need for static mixers downstream of the confluence of water and concentrate.

Figure 8:
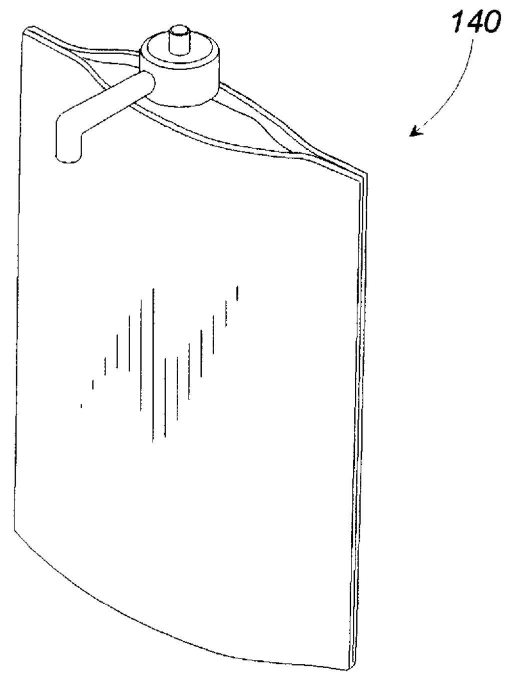
FIG. 8 is a perspective view of another embodiment of the package of this invention.

FIG. 8 is a perspective view of another embodiment of a concentrate package 140 of this invention. The package 140 is a flexible, collapsible pouch with a pump and mixer unit 92 as described above. The pouch does not require the vent 94.

Figure 9:
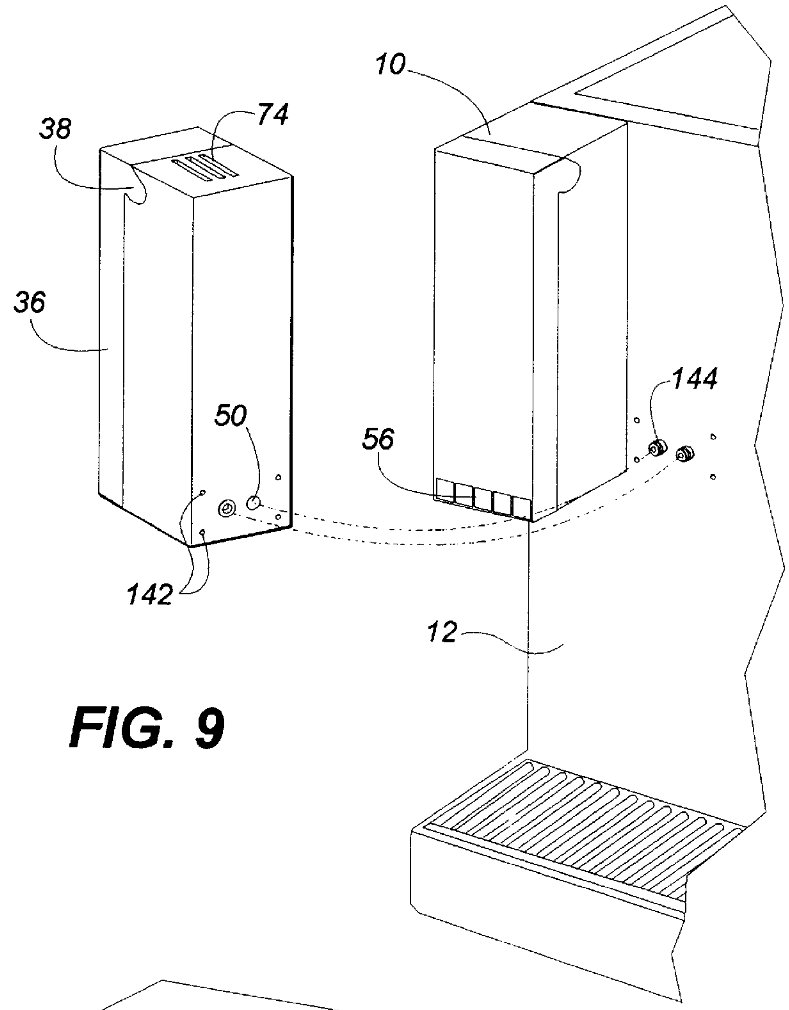
FIG. 9 is a perspective view showing how the module mounts on a dispenser.

FIG. 9 shows how the dispense module 10 attaches to a dispenser 12. If done as a retrofit, a standard valve, such as one of the valves 14 in FIG. 1, is removed from the standard mounting block. The mounting block is then also removed. The module is then attached by lifting the cover 20 to access four screw holes 142 and with the male water plug 144 on the dispenser inserted into the water inlet port 50 on the dispense module.

Figure 10:
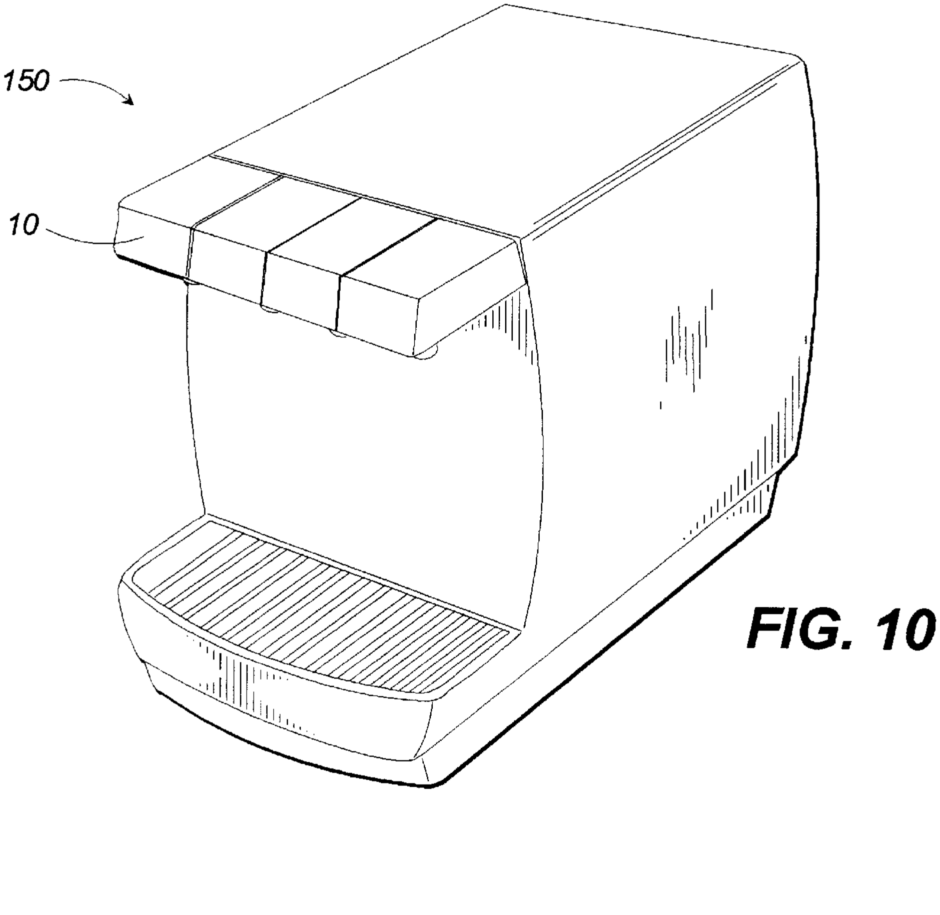
FIG. 10 is a perspective view of a low profile dispenser using a horizontal arrangement of the module of this invention.

FIG. 10 is a perspective view of a low profile dispenser 150 using a horizontal orientation for the module 10.

Figure 12:
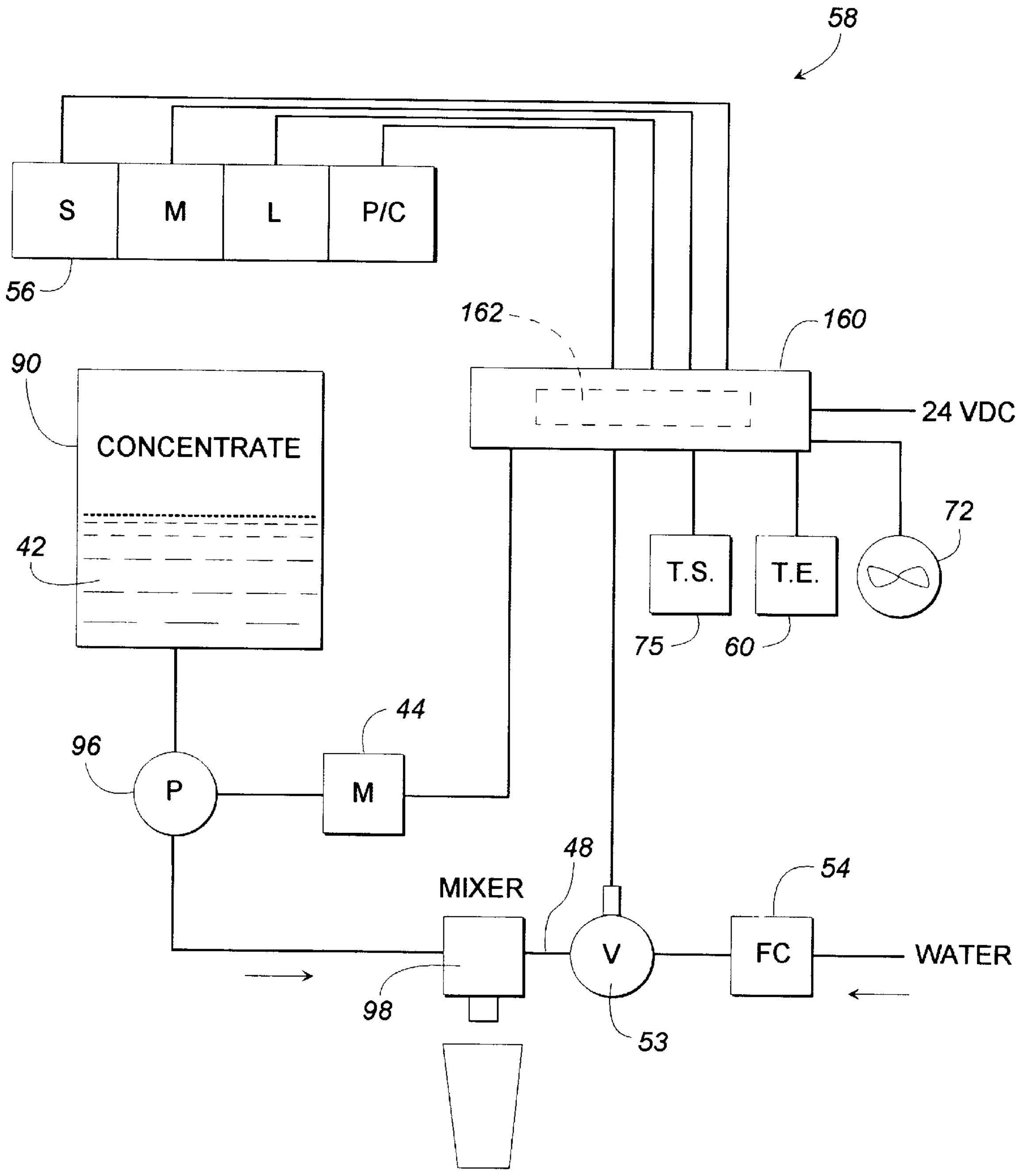
FIG. 12 is a partly diagrammatic, party schematic view of the control system of this invention.

FIG. 12 is a partly diagrammatic, partly schematic view of the control system 58 of the present invention. The control system includes a printed circuit board 160 having a microprocessor 162. The p.c. board is connected to each of the buttons 56 on the outside of the module, such as a small, medium, large and pour/cancel button. The p.c. board is also connected to the motor 44 for the pump 96 to control the flow of concentrate to the mixer 98, and to the solenoid controlled on-off water valve 53.

The control system 58 carries out the functions of set-up, calibration, ratio control, system diagnostics and inventory management. The system also controls the concentrate cooling functions of temperature management and fan control and receives input from the temperature sensor 75. The p.c. board is connected to both the thermo-electric chip 60 and the fan-motor 72. Preferably, the chip is energized constantly and the temperature is controlled by turning the fan motor on and off in response to input from the temperature sensor 75 as processed by the microprocessor.

Figure 13:
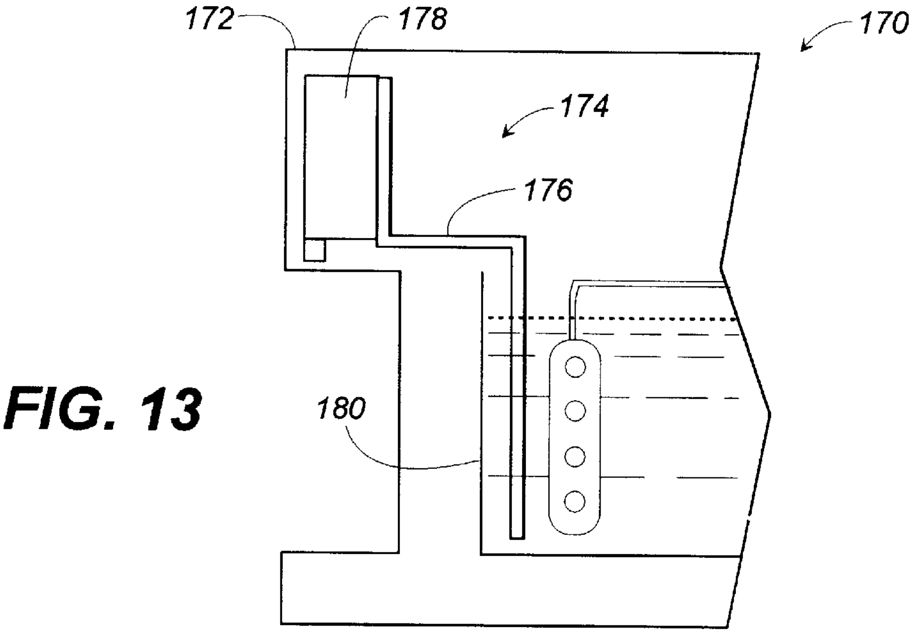
FIG. 13 is a partial cross-sectional view through a dispenser and module showing an alternative cooling system for the module.

FIG. 13 is a partial, cross-sectional view through an alternative embodiment of a dispenser 170 and dispense module 172, having an alternative refrigeration system 174. This refrigeration system includes an aluminum plate 176 that has one end located in the package chamber 178 and the other end located in the ice-water tank 180; cooling is effected by conduction through the plate. Because the ice-water tank is already present and available, this embodiment makes use thereof and saves the expense of the thermo-electric system used in the other embodiments.

Figure 14:
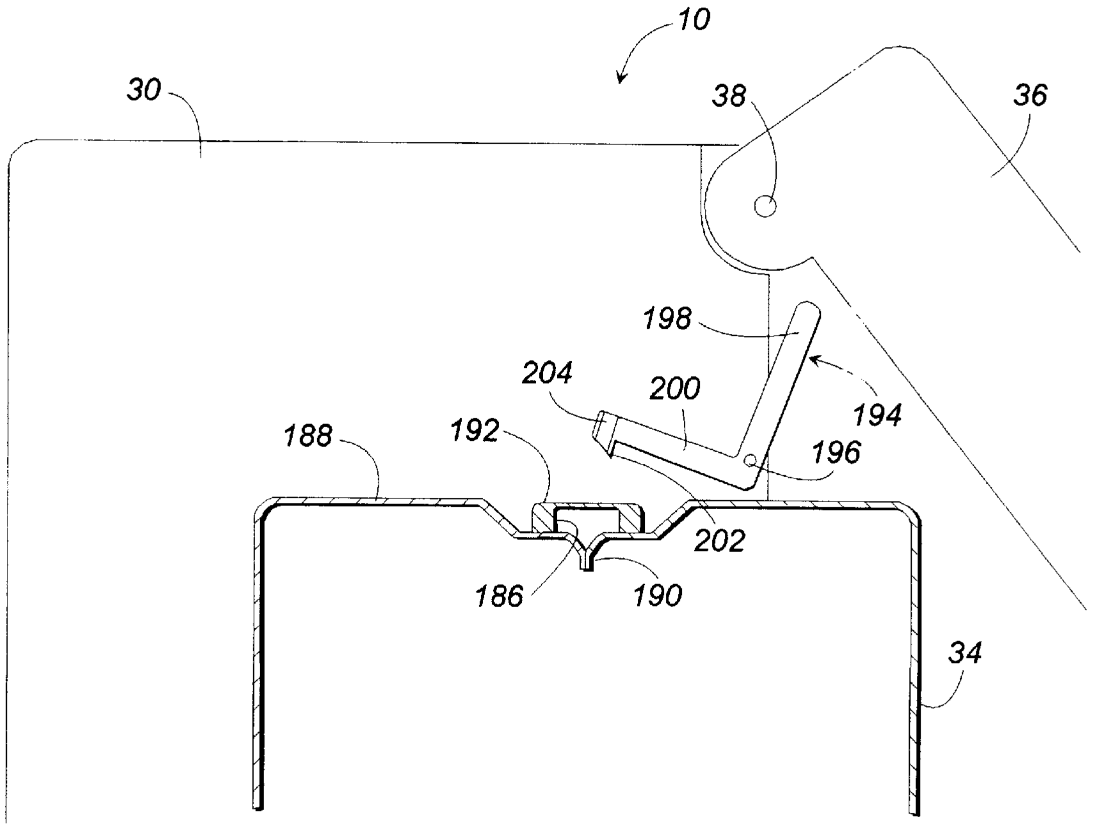
FIG. 14 is a partial cross-sectional view of the air vent mechanism.

FIG. 14 is a partial, cross-sectional view through the air vent mechanism. The package 34 preferably has an opening 186 in its top wall 188. A duckbill check valve 190 closes the opening and is covered by a shipping cover 192. The module includes a piercing device 194 pivoted at 196. The device includes a first arm 198 that is contacted by the closing door 36, to move a second arm 200 having a sharp end 202 in a hollow tube 204, to pierce the cover 192. As concentrate is pumped out of the package 34, the valve 190 will open to allow air into the package.

While the preferred embodiment of this invention has been described above in detail, it is to be understood that variations and modifications can be made therein without departing from the spirit and scope of the present invention. For example, the motor 44 need not be electrical; it could also be a single or double-acting pneumatic or hydraulic pump. It could be driven by the pressurized water, for example.

What is claimed is:

1. A method for retrofitting a postmix soft drink dispenser to also dispense from a front-loading dispensing module comprising the steps of:

(a) providing a postmix soft drink dispenser having a water cooling system including a carbonated water circuit and a still water circuit, a plurality of removable beverage dispensing valves, an electrical power supply, and means for mounting said valves on said dispenser;

(b) providing a dispensing module including (1) a module housing;

(2) a concentrate package chamber in said module housing;

(3) said module housing including a door providing access to said package chamber for inserting and removing a concentrate package;

(4) a refrigeration system in said module housing for cooling said package chamber;

(5) a motor in said module housing;

(6) a pump drive in said package chamber, connected to and driven by said motor;

(7) a water conduit in said module housing including an inlet port on said module housing and an outlet port in said package chamber;

(8) an electrical on-off solenoid valve in said water conduit;

(9) a beverage dispense button;

(10) a control system in said module housing for controlling said motor and said on-off valve when said button is activated; and

(11) attachment means on said module housing for mounting said dispensing module on said dispenser; and (c) removing a dispensing valve and replacing it with a dispensing module.

2. The method as recited in claim 1 including the steps of inserting into said package chamber, a juice concentrate package including an integral pump, mixing chamber having a water inlet port, and outlet nozzle; coupling said pump drive to said pump; and connecting said outlet port of said water conduit to said water inlet port of said mixing chamber.

3. The method as recited in claim 2 wherein said juice concentrate is for use in dispensing a non-carbonated beverage, and wherein said replacing step includes connecting a still water conduit to said inlet port on said module housing.

4. The method as recited in claim 1 wherein said refrigeration system is a thermoelectric cooling system.

5. A postmix beverage dispensing module for attachment to a fountain beverage dispenser comprising:

(a) a module housing;

(b) a concentrate package chamber in said module housing;

(c) said module housing including a door for providing access to said package chamber for inserting and removing a concentrate package;

(d) a refrigeration system in said module housing for cooling said package chamber;

(e) a motor in said module housing;

(f) a pump drive in said package chamber, connected to and driven by said motor;

(g) a water conduit in said module housing including an inlet port on said module housing and an outlet port in said package chamber;

(h) an electrical on-off solenoid valve in said water conduit;

(i) a beverage dispense button; and (j) a control system in said module housing for controlling said motor and said on-off valve when said button is activated.

6. The module as described in claim 5 including a concentrate package located in said package chamber, said package including an integral pump, a mixing chamber having a water inlet port, and an outlet nozzle; said pump being drivingly connected to said pump drive, and said outlet port of said water conduit being connected to said inlet port of said mixing chamber.

7. The module as recited in claim 5 wherein said door is on the front of said module housing.

8. The module as recited in claim 5 wherein said refrigeration system is a thermoelectric system.

9. The module as recited in claim 8 including a concentrate package located in said package chamber, said package including an integral pump, a mixing chamber having a water inlet port, and an outlet nozzle; said pump being drivingly connected to said pump drive, and said outlet port of said water conduit being connected to said inlet port of said mixing chamber and wherein said door is on the front of said module housing.

10. The module as recited in claim 5 wherein said module includes a water flow control.

11. A postmix beverage dispenser comprising:

(a) a dispenser housing adapted to be located on a counter-top;

(b) a water cooling system including water cooling coils and a cold-water conduit having an outlet port; and (c) a dispensing module connected to said housing, said module including:

(1) a module housing;

(2) a concentrate package chamber in said module housing;

(3) said module housing including a door providing access to said package chamber for inserting and removing a concentrate package;

(4) a refrigeration system in said module housing for cooling said package chamber;

(5) a motor inside said module housing;

(6) a pump drive in said package chamber, connected to and driven by said motor;

(7) a water conduit in said module housing including an inlet port on said module housing and an outlet port in said package chamber, said inlet port being coupled to said outlet port of said cold-water conduit;

(8) an electric on-off solenoid valve in said water conduit;

(9) a beverage dispense button;

(10) a control system in said module housing for controlling said motor and said on-off valve, when said button is activated.

12. The dispenser as recited in claim 11 wherein said water cooling system is a cold plate.

13. The dispenser as recited in claim 11 wherein said water cooling system is a mechanical refrigeration system.

14. The dispenser as recited in claim 11 wherein said dispenser housing is a tower.

15. The dispenser as recited in claim 11 wherein said dispenser includes a plurality of postmix dispensing valves and at least one of said dispensing modules.

16. The dispenser as recited in claim 15 including a carbonator providing carbonated water to at least one of said dispensing valves.

17. The dispenser as recited in claim 16 wherein each of said dispensing valves and said dispensing modules has approximately the same width, whereby at least one of said dispensing valves can be removed and replaced with one of said dispensing modules.

18. The dispenser as recited in claim 11 wherein said dispenser includes a carbonated water circuit and a still water circuit.

19. The dispenser as recited in claim 11 wherein said motor is an electric motor.

20. The dispenser as recited in claim 11 wherein said refrigeration system is a thermoelectric cooling system.

21. The dispenser as recited in claim 11 wherein said refrigeration system includes a metal plate extending from said package chamber into said water cooling system of said dispenser.

22. The dispenser as recited in claim 11 including a concentrate package located in said package chamber, said package including an integral pump, a mixing chamber including a water inlet port and an outlet nozzle; said pump drive being drivingly coupled to said pump; and said outlet port of said water conduit being connected to said water inlet port of said mixing chamber.

23. The dispenser as recited in claim 22 wherein said package includes concentrate for a non-carbonated beverage and wherein said cold-water conduit carries still water.

24. The dispenser as recited in claim 23 wherein said dispenser includes a carbonator and said water cooling system includes both a carbonated water circuit and a still water circuit.

25. The dispenser as recited in claim 11 wherein said door is on the front of said module housing for easy insertion and removal of concentrate packages.

26. The dispenser as recited in claim 11 wherein said dispenser and said dispensing module include mating electrical wiring harnesses.

27. A concentrate package for use in a postmix beverage dispenser comprising:

(a) a concentrate container enclosing a concentrate chamber;

(b) an integral pumping, mixing and dispensing unit connected to said container and including a pump, a mixer and an outlet nozzle;

(1) said pump including a pump housing enclosing a pumping chamber and including a reciprocatable piston slidably mounted in said pumping chamber, said pump housing including an inlet port and an outlet port, a one-way inlet valve in said inlet port, a one-way outlet valve in said outlet port, said inlet port being in liquid communication with said concentrate chamber;

(2) said mixer including a mixer housing enclosing a mixing chamber surrounding the outside surface of said pump housing, said mixer housing including a concentrate inlet port, a water inlet port, and an outlet port; said outlet port from said pump housing also being said concentrate inlet port into said mixing chamber; said mixing chamber having a thin, elongated, annular shape and said inlet port having a thin, annular shape for feeding a wide but narrow stream of concentrate into said mixing chamber for improved mixing with water introduced through said water inlet port; and (3) said nozzle having an inlet port and a beverage dispensing outlet port, said nozzle inlet port being said outlet port of said mixing chamber.

28. The package as recited in claim 27 wherein said container is blow molded, has a vent port on an upper end and an outlet opening on a lower end sealingly connected to said inlet port on said pump housing.

29. The package as recited in claim 27 wherein said container is a flexible, collapsible pouch having an outlet opening sealingly connected to said inlet port on said pump housing.

30. The package as recited in claim 27 including a piston rod connected to said piston and extending exteriorly of said assembly.

31. The package as recited in claim 27 wherein said one-way valve in said outlet port of said pumping chamber is a hollow cylindrical sleeve including a conical portion tapering to a wider diameter in the direction towards said mixing chamber.

32. An integral pump and mixing chamber assembly comprising:

(a) an assembly housing including a pumping housing enclosing a pumping chamber and a mixing housing enclosing a mixing chamber;

(b) said pumping housing including an inlet port into said pumping chamber and an outlet port from said pumping chamber and a reciprocable piston mounted in said pumping chamber;

(c) said mixing housing including a concentrate inlet port, a water inlet port, and a mixture outlet port;

(d) a piston rod connected to said piston and extending exteriorly of said assembly;

(e) said outlet port of said pumping chamber being said concentrate inlet port of said mixing chamber;

(f) said mixing chamber having a hollow cylindrical shape, with a narrow width, with said concentrate inlet port being a narrow annular opening at said upper axial end with said water inlet port being a circular opening extending perpendicularly into said mixing chamber at one side of mixing chamber at said lower axial end, and said mixture outlet port located at said lower axial end and at the opposite side of said mixing chamber from said water inlet port;

(g) a one-way inlet valve in said pumping chamber inlet port, and a one-way outlet valve in said pumping chamber outlet port; and (h) said pumping chamber outlet port being annular in shape and said one-way valve in said pumping chamber outlet port being frusto-conical in shape, tapering to a larger diameter in the outward flow direction.

33. The assembly as recited in claim 32 wherein said assembly housing is injection molded, said one-way valve in said pumping chamber inlet port is an umbrella valve, and said one-way valve in said pumping chamber outlet port is an annular outlet check valve.

* * * * *